United States Patent [19]
Blair et al.

[11] Patent Number: 5,539,660
[45] Date of Patent: Jul. 23, 1996

[54] MULTI-CHANNEL COMMON-POOL DISTRIBUTED DATA STORAGE AND RETRIEVAL SYSTEM

[75] Inventors: David K. Blair, Bennion; Scott K. Curtis; Philip H. Lucht, both of Salt Lake City, all of Utah

[73] Assignee: Philips Electronics North America Corporation, New York, N.Y.

[21] Appl. No.: 125,996

[22] Filed: Sep. 23, 1993

[51] Int. Cl.⁶ .................................................. H04Q 11/00
[52] U.S. Cl. ............................ 364/514 C; 348/7; 348/16; 370/53
[58] Field of Search .................................. 364/514, 284, 364/284.4, 243.3, 230; 395/200, 250; 348/6, 7, 8, 16; 370/53; 340/826

[56] References Cited

U.S. PATENT DOCUMENTS

| | | | |
|---|---|---|---|
| 4,421,965 | 12/1983 | Gentric et al. | 200/175 |
| 4,949,171 | 8/1990 | Grandmousin | 358/93 |
| 4,949,187 | 8/1990 | Cohen | 358/335 |
| 5,163,131 | 11/1992 | Row et al. | 395/200 |
| 5,179,552 | 1/1993 | Chao | 370/60 |
| 5,311,423 | 5/1994 | Clark | 364/401 |
| 5,341,474 | 8/1994 | Gelman et al. | 395/200 |
| 5,355,453 | 10/1994 | Row et al. | 395/200 |
| 5,371,532 | 12/1994 | Gelman et al. | 348/7 |

OTHER PUBLICATIONS

TQS Digital Communications and Signal Processing, Digital Crosspoint Switch No. TQ8016, 8 pages.

*Primary Examiner*—Emanuel T. Voeltz
*Assistant Examiner*—Patrick J. Assouad
*Attorney, Agent, or Firm*—Edward W. Goodman

[57] ABSTRACT

The system includes a plurality of disk arrays for storing, sequentially, contiguous segments of a data block. In the case of movies, each segment includes, for example, a few seconds of each relevant movie. An electronic commutator sequentially connects the disk arrays to a corresponding plurality of access channels. While the individual connections between each of the disk arrays and each of the access channels have a certain bit capacity, the overall bit capacity of the system is that certain bit capacity times the number of corresponding disk arrays and access channels. The electronic commutator switches sequentially between the respective connections at a predetermined rate which is commensurate with the size of the segments stored on the disk arrays and which is dependent on the desired amount of wait time for one access channel to be connected to each of the disk arrays.

14 Claims, 5 Drawing Sheets

MULTI-CHANNEL COMMON-POOL DISTRIBUTED DATA STORAGE AND RETRIEVAL SYSTEM

BACKGROUND OF THE INVENTION

1. Field of the Invention

The subject invention relates to the problem of providing simultaneous access for a number of users to a mass storage medium.

One of the advantages of present day cable television is the provision of pay-per-view features. However, a drawback is that the viewer is locked into viewing the program at the time that the feature is provided by the cable supplier.

A new service being proposed is video-on-demand where, for example, a movie selected by the user is provided to that user when desired by the user. One problem in implementing this type system is being able to store a large number of individual movies effectively. Another problem is being able to access and deliver these stored individual movies to different users.

2. Description of the Related Art

The first problem may be addressed by the various data compression schemes in which the video information is digitized and then compressed (JPEG, MPEG, etc.). This compressed data may then be stored in a mass storage medium.

The second problem is more problematical. There are various proposals for constructing a bus system ("big bus") for connecting the mass storage medium to a distribution system, e.g. a cable system. However, the design of this "big bus" is very complicated and is not subject to expansion. In particular, to achieve a high data bandwidth, the "big bus" would have to incorporate costly ultra-high speed components, since a bus has only one data path. In addition, in a high-bandwidth parallel digital bus type system having many data lines, devices attached to the bus must be physically close to the bus, and the bus can have only a limited physical length. Furthermore, such a bus would be very expensive.

SUMMARY OF THE INVENTION

It is an object of the present invention to provide a system of the above type which is easily expandable.

It is a further object of the present invention to provide such a system in a more economical fashion.

The above objects are achieved in a system for storing large amounts of data and for providing simultaneous plural access to said data, said system comprising a mass storage medium having a number N of individual storage arrays for storing said data, each of said individual storage arrays having input/output means; an access medium having a corresponding number N of access channels, each of said access channels having input/output means; a commutator having a corresponding number N of commutation paths, each of said paths connecting the input/output means of one of said individual storage arrays with the input/output means of one of said access channels; and control means for causing said commutator to cyclically switch said commutation paths such that $$T = N \times t$$

where t is the time spent at each position of the commutator and T is the amount of time for one of the access channels to have been connected to each and every one of the N number of storage arrays.

The subject invention is a distributed record/playback (write/read) storage system in which each data segment (file) is sub-divided into smaller data blocks which are written in cyclic fashion onto a set of storage arrays. The data so stored can be randomly accessed (for read and/or write) simultaneously by a multitude of access channels. These channels connect to the multiple storage arrays by means of a cyclic switching device called a commutator. The commutator repeats a cyclic pattern of "positions" such that, during each cycle, each access channel is connected to each storage array for some amount of time.

The subject invention solves the problem of allowing multiple channels to have high-bandwidth (real-time in the case of video) access into a common data pool in which each item is recorded only once, thus saving storage space and cost. Multiple storage arrays are necessary due to the large amount of data storage and data bandwidth required in many applications. Multiple simultaneous access channels are desirable because many "users" often wish to have independent access to all the data, as is the case with a conventional network computer "file server". However, in such a conventional file server, users must share the bandwidth of the network. The invention, in effect, provides each user with a full bandwidth private channel to all the data.

Since the invention has multiple access channels, one or more of these can be dedicated all the time (or some of the time) to the task of high-speed loading of data into the system, as the system continues to operate on its other channels. This is not possible with a conventional network file server where the single access channel must be time-shared between the loading function and normal access functions.

The subject invention is similar to the generally known RAID (Random Array of Independent Disks) method for storing computer data by distributing it on multiple disk drives. However a significant difference is that the RAID systems have only one access channel, whereas the subject invention supports a multitude of simultaneous access channels, each of which has access to the entire data pool.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
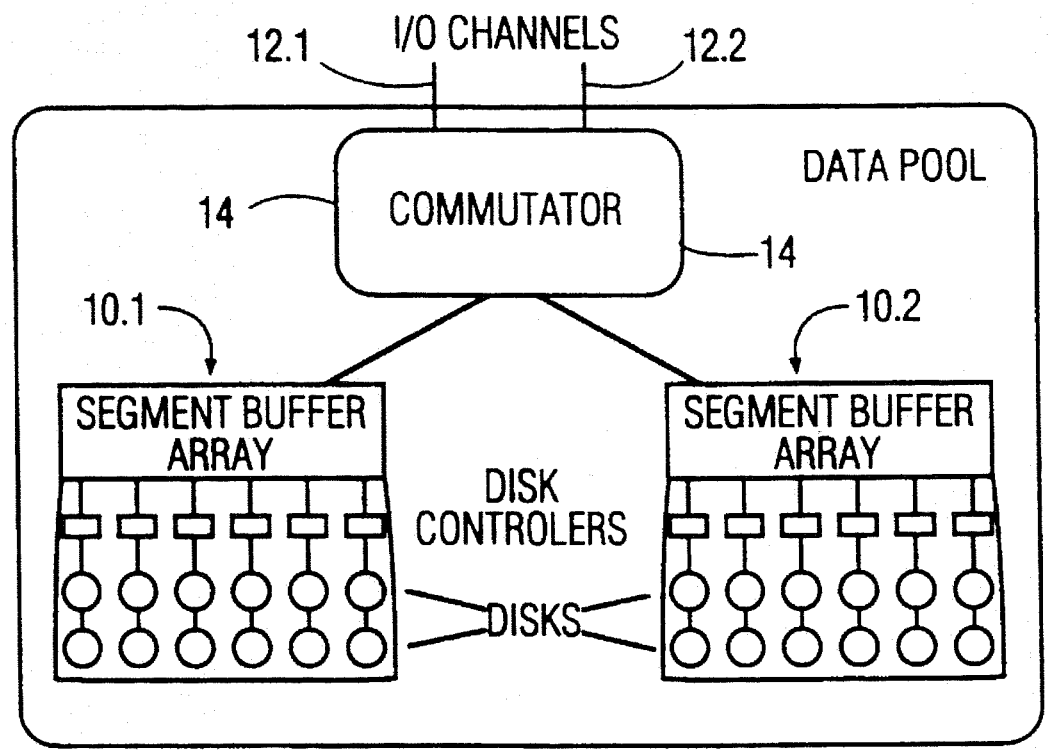
FIG. 1 shows a simplified block diagram of a first embodiment of the system having two input/output access channels and two storage arrays.

The system of the subject invention is basically shown in FIG. 1. Therein, the system includes two storage arrays 10.1 and 10.2, two input/output I/O access channels 12.1 and 12.2, and a commutator 14 for connecting the storage arrays to the I/O access channels. Under the control of a controller (not shown), the commutator 14 repetitively and alternately connects the I/O access channel 12.1 to the storage arrays 10.1 and 10.2, respectively, while simultaneously, repetitively and alternately connecting the I/O access channel 12.2 to the storage arrays 10.2 and 10.1, respectively. Depending on the cycle time of the commutator 14, each I/O access channel 12.1 and 12.2 has access to all of the stored data.

Figure 2:
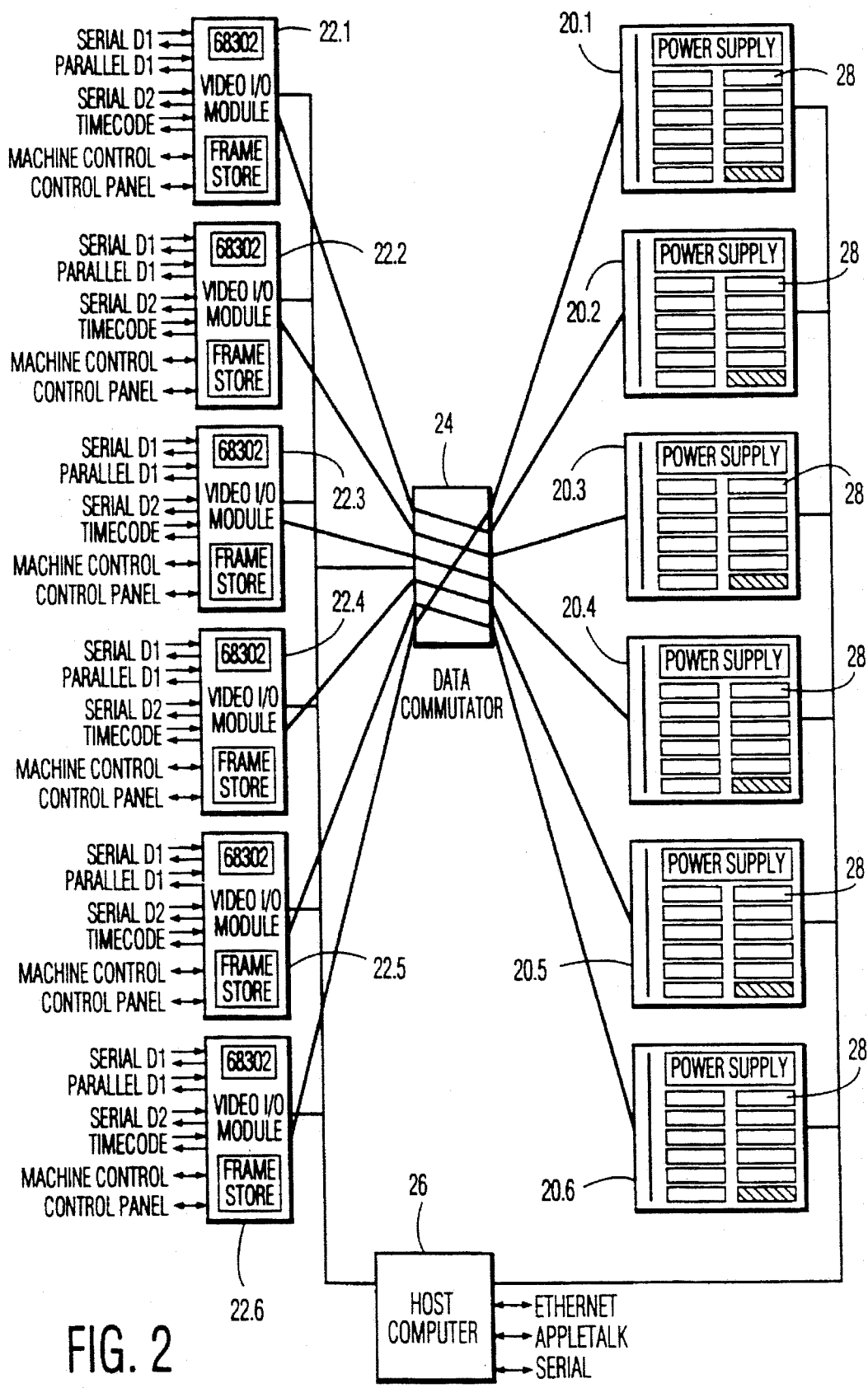
FIG. 2 shows a block diagram of a second embodiment of the system having six input/output access modules and six storage arrays for use as a multi-channel disk recorder.

FIG. 2 shows a second embodiment of the system for use as a multi-channel disk digital video recorder. This embodiment includes six storage arrays 20.1–20.6, six video I/O access modules 22.1–22.6, a commutator 24 and a host controller 26 in the form of a micro-computer. This system behaves as six independent VTRs with the distinction that the stored data is in a common pool which is accessible to all six "video heads". Each video module acts as either a record head or a playback head on this common data pool. It is of course possible that the video module may operate in both record and playback simultaneously. All six "video heads" can access this common pool simultaneously, in a manner conducive to non-linear editing. Any "video head" can switch between playback and record on any field boundary. Assuming for the moment that error correction is turned off and there is no data compression, each storage array, which includes twelve disk drives 28, can store, for example, 8 minutes of 10-bit D1 digital video data, so that the total system storage is 6×8=48 minutes. The data is stored on 6×12=72 disk drives. In fact, each field recorded from any of the six video channels is "sprayed" onto all 72 disk drives, so that each drive holds 1/72nd of each recorded field. Thus, when any field is read from the disk system, all 72 disk drives work in parallel to fetch the data for that field. Thus, the maximum disk bandwidth is utilized on every field access.

The commutator 24 is what allows the data for each video channel to be delivered to or from all six storage arrays 20.1–20.6. The commutator is like a 6-pole rotating switch which switches to a new position, for example, six times per video field, causing each field to be spread onto all six storage arrays. In FIG. 2, the commutator is shown in one of its six possible positions.

Figure 3:
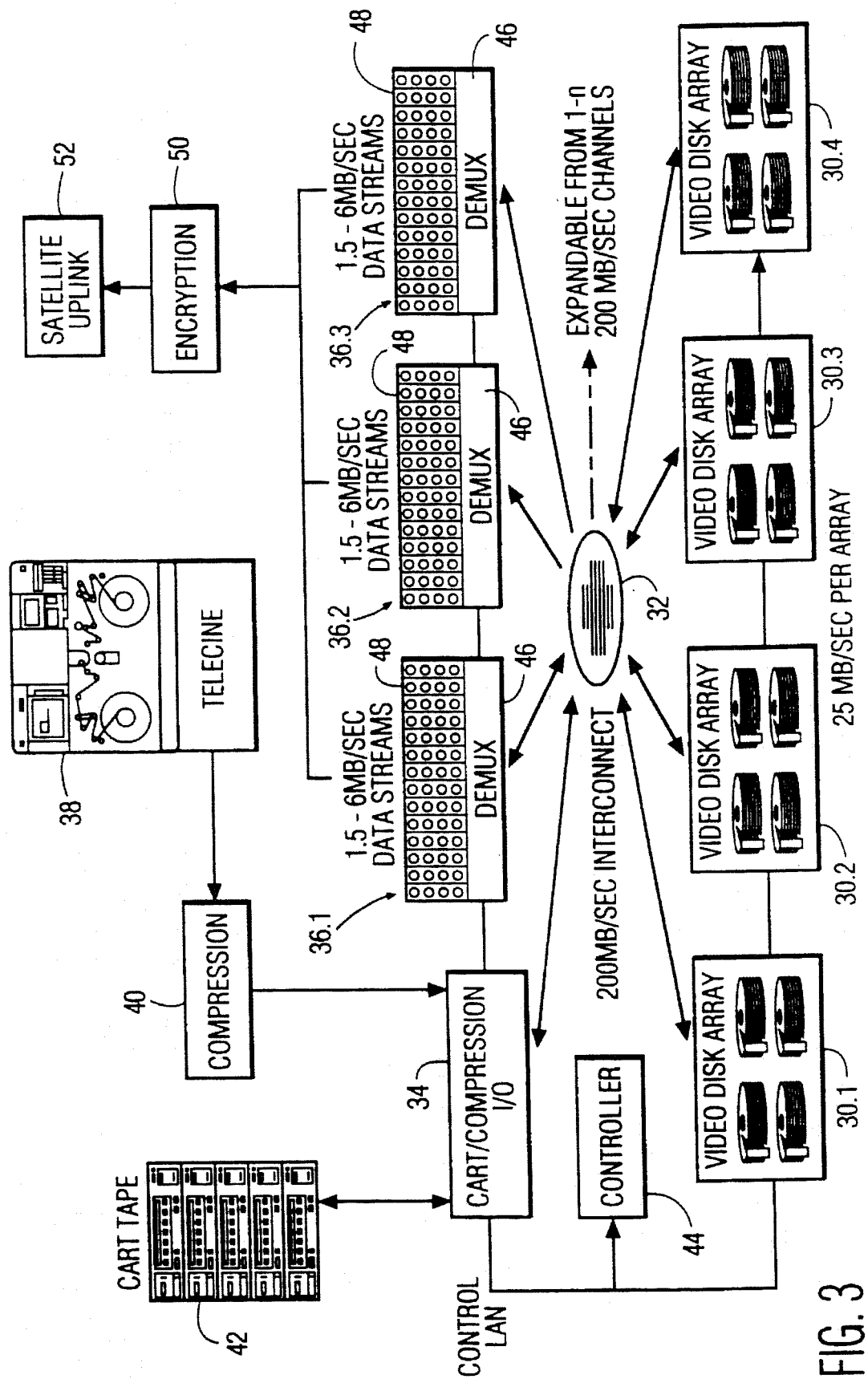
FIG. 3 shows a block diagram of a third embodiment of the system having three output access modules, one input/output access module and four storage arrays for use in a video supply system.

As noted above, it is contemplated that the system be used in a video-on-demand system. FIG. 3 shows an embodiment of such a system which includes four storage arrays 30.1–30.4, commutator 32, an input/output access module 34, and three video output access modules 36.1–36.3. As noted above, this system dedicates one access channel, input/output access module 34, exclusively for the task of high-speed loading of data into the system, while the system continues to operate on the other channels. To this end, a telecine 38 is shown for the transfer of film to video. The output from the telecine 38 is coupled to the input/output access module 34 through a digital video compression circuit 40. Additionally, tape cartridges containing video information may be loaded into the system via the tape drive arrangement 42 also coupled to the input/output access module 34. Each of the above devices are controlled by controller 44. While this embodiment shows three channels for outputting the stored video information, it should be recognized that significantly greater capacity may be had through the use of multiplexing. In particular, during each cycle of transfer of information from the various storage arrays, multiple sub-channels of information may be multiplexed. To this end, each of the video output access modules 36.1–36.3 includes a demultiplexer 46 coupling the bus from the commutator to a plurality of sub-channels 48 corresponding to the sub-channels of information retrieved from the storage arrays. These sub-channels 48 are then coupled to an encryption circuit 50 for transmission through a satellite uplink 52.

In a practical implementation of the above embodiment, a system may require the storage of 1,000 movies on-line and 1,600 movies near-line (i.e., access within 1 minute, for example, stored on tape), which are required to be accessed by 2,000 outputs. Assuming that each disk drive in the storage arrays is capable of storing 2 Gigabytes of information, the system would require at least 17 storage arrays each having 40 disk drives giving the system a total storage capacity of 1,350 GB. The commutator would then have 17 commutating paths connecting to one input/output access module and 16 video output access modules each having 128 demultiplexed sub-channel outputs.

Figure 4:
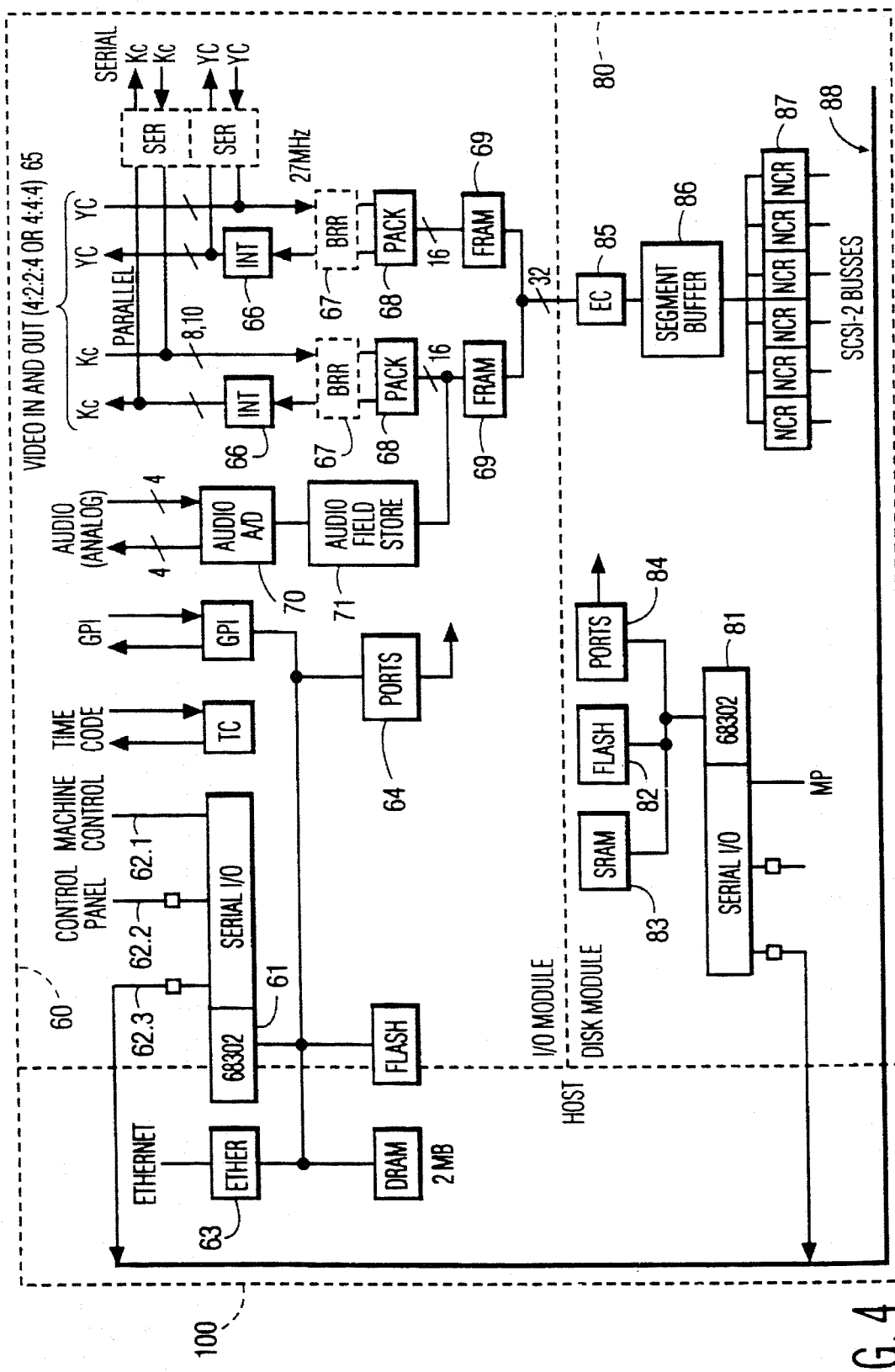
FIG. 4 shows a detailed block diagram of a typical storage array.

FIG. 4 shows a detained block diagram of a typical I/O module 60, a typical storage array 80 and a typical host (control unit) 100 of the type which can be used in a system in accordance with the invention. FIG. 4 shows the relationship between the devices when the I/O access module 60 is connected directly to the storage array 80. The I/O module 60 manages the input and output of video, audio, and control information to and from the external world. The input data is converted from video formats to a generic computer data format and is then transmitted to the disk module 80, as shown on the center right side of the figure. During the play process, this generic data is returned by the disk module 80, and is converted back to video/audio data by the I/O module 60. The I/O module is controlled by a microprocessor 61, Motorola 68302 CPU. This microprocessor contains a standard 68000 "core" and three high-speed serial channels 62.1–62.3. Each channel connects to a serial line, as shown at the top of the figure ("Serial I/O"). The small squares indicate LocalTalk adapters which in effect convert the serial line to a local area network (e.g., AppleTalk).

One serial line 62.1 is used for machine control. This allows the storage array to emulate a standard VTR. Timecode and GPI functions are also associated with machine control.

A second serial line 62.2 goes to a control panel which allows manual operation of the storage array.

The third serial line 62.3 connects directly to a serial line on the microprocessor in the disk module.

An Ethernet interface 63 provides for the transfer of image data between the storage array and a system controller.

A set of control and status registers 64 (PORTS) allows the 68302 to manage the flow of data in the data path section on the upper right side of the figure.

At the top of the data path are two 601-style video inputs and outputs 65. These are labeled YC for the normal picture channel, and Kc for the extra channel. In 4:2:2:2 mode, K is the key data. In 4:4:4 mode, c is the extra color information which is combined with the C of YC. It is also possible to operate in an RGB 4:4:4 mode.

The INT boxes 66 represent temporal and spatial field interpolators. These operate only on outgoing video data. The BRR boxes 67 denote a possible place for adding Bit Rate Reduction hardware to the system. The PACK boxes 68 are where the video formatted data is converted to generic 32-bit-wide computer data, and where sync data is removed from the data stream. This packing function allows for efficient data storage in both 8-bit and 10-bit video modes.

Data then flows into a set of FIFO RAM buffers 69 which allows for quasi-frame synchronization on the inputs. Data then transfers from the FRAM buffers into the disk module.

Four channels of analog audio data are digitized (16-bits/channel, 48KHz) in audio A/D 70 and are buffered in audio frame store 71 and then appended to the generic data in one of the FRAMs.

The disk module 80 transfers the generic computer data from the I/O module 60 to and from a set of Fast SCSI-2 (Small Computer Standard Interface) disk drives. The disk drives are controlled by NCR SCSI controller chips, which are in turn managed by a second Motorola 68302 CPU processor 81, with its associated FLASH RAM 82 and Static SRAM 83. As with the I/O module, this 68302 has three serial channels: one goes to the other 68302 in the I/O module, the second is used as a Maintenance Panel access point for debug purposes, and the third is unused. The PORTS box 84 indicates the registers used to control the data path on the lower right.

Data from the I/O module 60 enters the disk module and passes through an error correction circuit EC 85. Here, redundant data is generated which protects the user against the failure of any single SCSI disk drive. The error-corrected data is then fed into a segment buffer 86, where large "segments" of generic data are accumulated for writing to disk. The data segments are steered to one of several NCR SCSI controller chips 87. In turn, these chips direct the data to one of several SCSI-2 drives 88 which are connected to each SCSI bus.

The data segments must be large so as to minimize the overhead cost of disk seek times. Multiple fields of video data are written in a single shot.

During playback mode data is retrieved from the disks and placed into the segment buffer. If any disk drive has failed, the error correction circuit reconstitutes the original data stream, and the corrected data is then fed back to the I/O module 60. The system continues to operate as if no failure occurred, and the user is notified that a failed drive should be replaced at the next maintenance opportunity.

The host 100 represents a set of software management and control processes which run on the 68302 CPU of the I/O module 60. For this reason, in the figure, the 68302 CPU processor of the I/O module and its associated FLASH and DRAM memory are extended into the host part of the figure.

In the above description, it has been assumed that the data supplied to the storage array is in analog form. However, in a proposed system where the data is already in generic digital form, the I/O module 60 may be obviated.

The purpose of the commutator is to interconnect a plurality of storage arrays and a plurality of access channels. In terms of FIG. 4, one can assume that the I/O access module 60 is actually connected to the storage array 80 by means of a commutator (not shown). The concept of the system is such that each I/O access channel will access many or all of the storage arrays in a repeated sequential manner. An I/O access channel will only access one storage array at a given time, then it will access the next storage array in the sequence, continuing through the full sequence. The other I/O access channels in the complete system are also being sequentially switched to the storage arrays, such that all of the active I/O access channels access each of the active storage arrays on a time shared basis.

The commutator may be implemented as a cross-point matrix switch. The cross-point matrix switch has a number of inputs, designated by "N" in FIGS. 5a–5e, and a number of outputs, designated by "M" in the figures. Cross-point matrix switches allow any output to be connected to any single input at any time and in any combination. An example of a cross-point matrix switch is the 16×16 Digital Cross-point Switch No. TQ8016, made by TQS Digital Communications and Signal Processing. This switch is capable of handling a 1.3 Gbit/s data rate as a minimum. A user of this switch may independently configure any switch output to any input, including an input chosen by another output. To this end, the controller 44 of FIG. 3 (or host computer 26 of FIG. 2) is programmed to periodically generate the appropriate output addresses for the inputs of the switch to, in effect, commutate the switch cyclically through each of the connections.

Figure 5A:
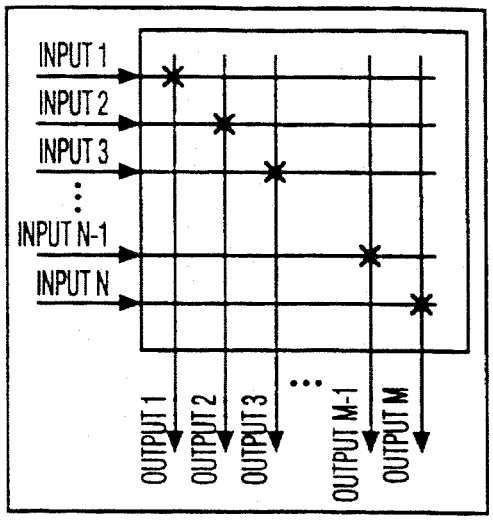
FIGS. 5a–5e show the various switching positions of an embodiment of the commutator in the form of a cross-point matrix switch.
Figure 5B:
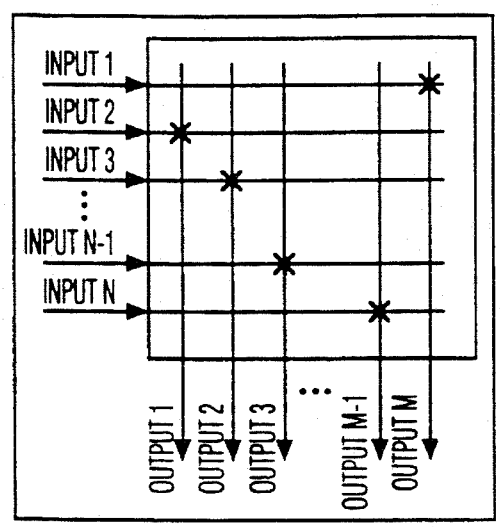
Figure 5C:
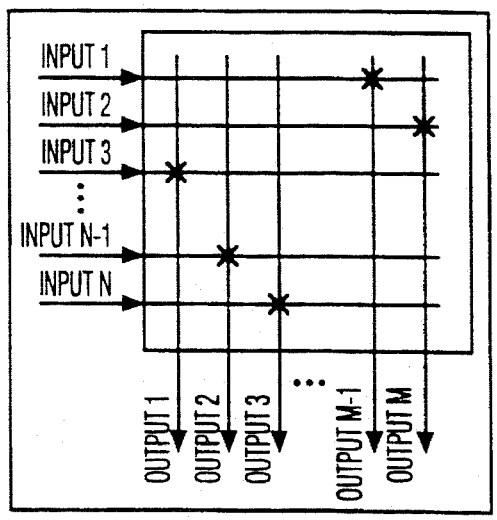
Figure 5D:
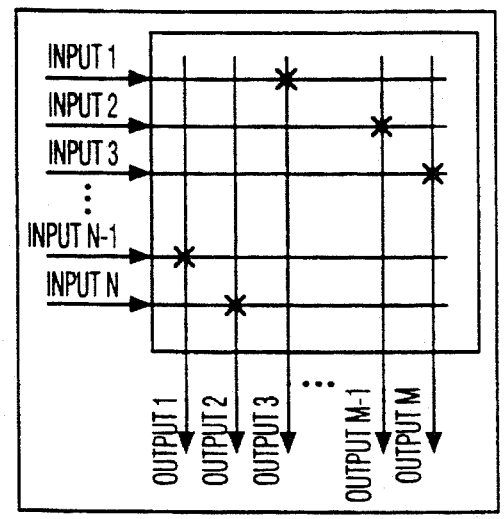
Figure 5E:
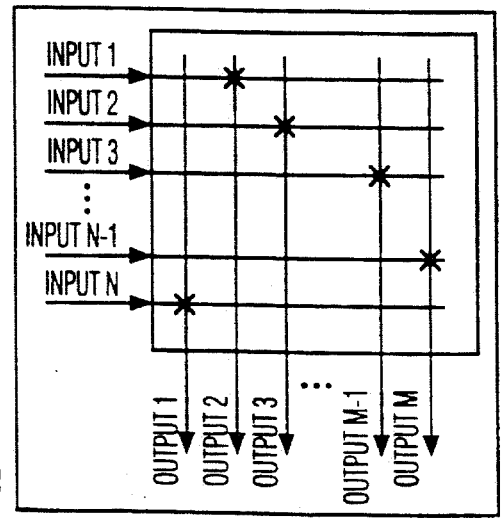

FIGS. 5a–5e illustrate the operation of a cross-point matrix switch when used as a commutator, with the "X" marks indicating the cross-points that have been turned on making a connection from the designated input to the designated output. FIG. 5a shows a possible starting condition where output 1 is connected to input 1, output 2 is connected to input 2, etc. FIG. 5b shows a configuration for the next position where output 1 is connected to input 2, output 2 is connected to input 3, etc., with output M being connected to input 1. FIGS. 5c and 5d show the next two conditions, while FIG. 5e shows the condition just prior to the sequence repeating and making the connections shown in FIG. 5a.

The data stored in the storage arrays may be digital or analog in nature. Digitally stored data may be generic data normally associated with a computer file system, or it may be a digital representation of video and/or audio signals. Regardless of what the data represents, it may be stored in a compressed format for dense recording, and may be decompressed on playback.

A given system is readily expandable by using a commutator with more commutating paths and by adding additional storage arrays and input/output access channels. The trunk lines going to the commutator may be bi-directional read/write lines, or they may be dedicated read-only or write-only lines. Correspondingly, some access channels may be read-only or write-only. Each trunk line may be a single wire, or may be a cable containing more than one wire. Alternatively, each trunk line may be one or more optical fibers, the commutator then being an optical switching device.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A system for storing large amounts of data and for providing simultaneous plural access to said stored data, said system comprising:

a mass storage medium having a number N of individual storage arrays for storing said data, each of said storage arrays having input/output means for inputting data to all of said storage array and/or for accessing all of the data stored in said storage array;

an access medium having a corresponding number N of access channels, each of said access channels having input/output means;

a commutator having a corresponding number N of commutation paths, each of said commutation paths connecting the input/output means of one of said number of individual storage arrays with the input/output means of one of said access channels such that said one access channel has access to all of the data stored in said one individual storage array; and control means for causing said commutator to cyclically switch said commutation paths such that $$T=N\times t$$

where t is the time spent at each position of the commutator, and T is the amount of time for one of the access channels to have been connected to each and every one of the N number of individual storage arrays.

2. A system as claimed in claim 1, wherein each of said individual storage arrays comprises a plurality of storage sections each having an input/output line, said input/output means of each of said individual storage arrays comprising said input/output lines in combination, thereby enabling plural access to said storage sections in parallel.

3. A system as claimed in claim 2, wherein each of said access channels comprises a plurality of access sub-channels each having an input/output line, said input/output means of each of said access channels comprising said input/output lines in combination, thereby enabling parallel processing by said access sub-channels of said stored data accessed from said storage sections in parallel.

4. A system as claimed in claim 1, wherein said data is recorded onto said mass storage medium in segments distributed sequentially among said individual storage arrays, each of said segments being wholly accessible within said time t, whereby each of said access channels may access the same stored data within a time period of $(N-1)\times t$.

5. A system as claimed in claim 2, wherein said storage sections are magnetic disks.

6. A system as claimed in claim 2, wherein said data is written into at least two of said storage sections redundantly.

7. A system as claimed in claim 5, wherein said data is written into at least two of said storage sections redundantly.

8. A system as claimed in claim 1, wherein said data is compressed video data representing a plurality of movies.

9. A system as claimed in claim 8, wherein said access medium is part of a cable television system.

10. A system as claimed in claim 3, wherein said input/output lines of said storage sections and said access sub-channels have a first bit rate, and said control means causes said stored data to be transferred from said storage sections to said access sub-channels at said first bit rate during each time t, each of said access sub-channels including an access line having a second bit rate, slower than said first bit rate, for providing the stored data, and a buffer memory for temporarily storing the stored data accessed from the storage sections to compensate for the dissimilarity between the first bit rate and the second bit rate.

11. A system as claimed in claim 1, wherein the commutator is arranged for switching electrical signals.

12. A system as claimed in claim 11, wherein said electrical signals are digital.

13. A system as claimed in claim 11, wherein the commutator is a cross-point matrix switch having a plurality of inputs and outputs, connecting means for selectively connecting said inputs to said outputs, and addressing means for controlling said connecting means, said addressing means having an address input, and wherein said control means includes means for generating addresses for application to said address input of said addressing means for causing said cross-point matrix switch to commutate by cyclically connecting each of said inputs to each of said outputs.

14. A system as claimed in claim 1, wherein the commutator is arranged for switching optical signals.

* * * * *